United States Patent
Jung

(10) Patent No.: US 11,675,712 B2
(45) Date of Patent: Jun. 13, 2023

(54) MEMORY SYSTEM, MEMORY CONTROLLER, AND OPERATION METHOD OF MEMORY SYSTEM

(71) Applicant: SK hynix Inc., Gyeonggi-do (KR)

(72) Inventor: In Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/012,735

(22) Filed: Sep. 4, 2020

(65) Prior Publication Data

US 2021/0334218 A1 Oct. 28, 2021

(51) Int. Cl.
*G06F 12/00* (2006.01)
*G06F 12/109* (2016.01)
*G06F 12/0875* (2016.01)

(52) U.S. Cl.
CPC ........ *G06F 12/109* (2013.01); *G06F 12/0875* (2013.01); *G06F 2212/608* (2013.01)

(58) Field of Classification Search
CPC .............. G06F 12/109; G06F 12/0875; G06F 2212/608
See application file for complete search history.

(56) References Cited

U.S. PATENT DOCUMENTS

| | | | | |
|---|---|---|---|---|
| 8,788,783 B1* | 7/2014 | Karnati | ................. | G06F 12/084 711/170 |
| 2010/0023672 A1* | 1/2010 | Gorobets | ............ | G06F 12/0246 711/103 |
| 2011/0238672 A1* | 9/2011 | Agarwala | ........... | H04L 67/1097 707/748 |
| 2019/0317894 A1* | 10/2019 | Frolikov | ............. | G06F 12/0802 |
| 2021/0042230 A1* | 2/2021 | Gupta | ................... | G06F 12/123 |

FOREIGN PATENT DOCUMENTS

KR 10-2014-0112397 9/2014
KR 10-2018-0079900 7/2018

* cited by examiner

*Primary Examiner* — Gurtej Bansal
(74) *Attorney, Agent, or Firm* — IP & T Group LLP

(57) ABSTRACT

Embodiments of the present disclosure relate to a memory system, a memory controller, and an operation method of a memory system. According to embodiments of the present disclosure, the memory system, before updating a mapping table which includes mapping information between logical addresses and physical addresses, may assign a portion of a map cache area for caching a plurality of map segments in the mapping table as a map update area for updating the mapping table, and may load a subset of the plurality of map segments to the map update area. Accordingly, it is possible to quickly update a mapping table and to optimize update performance for a mapping table within a limit that guarantees caching performance to a predetermined level or higher.

17 Claims, 15 Drawing Sheets

MEMORY SYSTEM, MEMORY CONTROLLER, AND OPERATION METHOD OF MEMORY SYSTEM

CROSS REFERENCE TO RELATED APPLICATION

The present application claims priority under 35 U.S.C. 119(a) to Korean patent application number 10-2020-0048388, filed on Apr. 22, 2020, which is incorporated herein by reference in its entirety.

BACKGROUND

1. Field

Embodiments of the present disclosure relate to a memory system, a memory controller, and an operation method of a memory system.

2. Description of the Prior Art

A memory system, e.g., a storage device stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

The memory system uses a mapping table for managing mapping information between a logical address of the memory requested from a host and a physical address of the memory device when performing a read or write operation on the basis of a command received from the host. The memory system may cache map segments in a map cache area in order to quickly retrieve mapping information from the mapping table. In addition, the memory system may update the mapping table at specific intervals or when specific events occur in order to reflect changes in the mapping table.

SUMMARY

Embodiments of the present disclosure may provide a memory system, a memory controller, and an operation method of a memory system capable of quickly updating a mapping table when updating the same.

In addition, embodiments of the present disclosure may provide a memory system, a memory controller, and an operation method of a memory system capable of optimizing update performance for a mapping table within a limit that guarantees caching performance for the mapping table to a predetermined level or higher.

In an aspect, embodiments of the present disclosure may provide a memory system including a memory device and a memory controller coupled to the memory device.

Before updating a mapping table which includes mapping information between logical addresses and physical addresses, the memory controller may assign a portion of a map cache area for caching a plurality of map segments in the mapping table as a map update area for updating the mapping table.

The memory controller may load a subset of the plurality of map segments to the map update area.

The memory controller may assign a portion of the map cache area as the map update area when the number of writable pages in an open memory block of the memory device is less than or equal to a threshold number of pages. The open memory block may be a memory block configured to process write commands received from a host.

In this case, the sub-area in the map update area may be 1) a sub-area in which the map segment is not cached or 2) a sub-area in which any of N least recently used map segments, the hit counts of which per a first period of time are less than a threshold hit count, is cached. Here, N may be a natural number.

The memory controller may load, to the map update area, a target map segment, which is a map segment including a logical address of data written to the open memory block, among the plurality of map segments. The memory controller may manage a list of the target map segments in an array.

The memory controller may change the size of the map update area by comparing a hit ratio of the map cache area with a reference hit ratio when the ratio of write commands to all commands received from a host for a second period of time is greater than or equal to a threshold ratio.

The reference hit ratio may be changed in proportion to the size of the map update area.

For example, the memory controller may increase the size of the map update area when the hit ratio of the map cache area is greater than or equal to the reference hit ratio during a third period of time.

As another example, the memory controller may decrease the size of the map update area when the hit ratio of the map cache area is less than the reference hit ratio during a third period of time.

In another aspect, embodiments of the present disclosure may provide a memory controller including a memory interface configured to communicate with a memory device and a control circuit coupled to the memory device.

Before updating a mapping table which includes mapping information between logical addresses and physical addresses, the control circuit may assign a portion of a map cache area for caching a plurality of map segments in the mapping table as a map update area for updating the mapping table.

The control circuit may load a subset of the plurality of map segments to the map update area.

The control circuit may assign a portion of the map cache area as the map update area when the number of writable pages in an open memory block of the memory device is less than or equal to a threshold number of pages. The open memory block may be a memory block configured to process write commands received from a host.

In this case, the sub-area in the map update area may be 1) a sub-area in which the map segment is not cached or 2) a sub-area in which any of N least recently used map segments, the hit counts of which per a first period of time are less than a threshold hit count, is cached. Here, N may be a natural number.

The control circuit may load, to the map update area, a target map segment, which is a map segment including a logical address of data written to the open memory block, among the plurality of map segments. The control circuit may manage a list of the target map segments in an array.

The control circuit may change the size of the map update area by comparing a hit ratio of the map cache area with a reference hit ratio when the ratio of write commands to all commands received from a host for a second period of time is greater than or equal to a threshold ratio.

In this case, the reference hit ratio may be changed in proportion to the size of the map update area.

For example, the control circuit may increase the size of the map update area when the hit ratio of the map cache area is greater than or equal to the reference hit ratio during a third period of time.

As another example, the control circuit may reduce the size of the map update area when the hit ratio of the map cache area is less than the reference hit ratio for a third period of time.

An operation method of a memory system including a memory device and a memory controller configured to control the memory device may include: before updating a mapping table which includes mapping information between logical addresses and physical addresses, assigning a portion of a map cache area for caching a plurality of map segments in the mapping table as a map update area for updating the mapping table.

In addition, the operation method of a memory system may include loading a subset of the plurality of map segments to the map update area.

A portion of the map cache area may be assigned as the map update area when the number of writable pages in an open memory block of the memory device is less than or equal to a threshold number of pages.

The sub-area in the map update area may be 1) a sub-area in which the map segment is not cached or 2) a sub-area in which any of N least recently used map segments, the hit counts of which per a first period of time are less than a threshold hit count, is cached. Here, N is a natural number.

The size of the map update area may be changed based on a result of comparing a hit ratio of the map cache area with a reference hit ratio when the ratio of write commands to all commands received from a host for a second period of time is greater than or equal to a threshold ratio.

In another aspect, embodiments of the present disclosure may provide a memory system including: a memory device including an open memory block and a controller including a mapping table, which stores multiple map segments indicating mapping between logical addresses and physical addresses for the memory device, and a map cache area for caching the multiple map segments.

The controller may assign a portion of a map cache area as a map update area based on the number of writable pages in the open memory block.

The controller may load a subset of the plurality of map segments to the map update area.

The controller may update the mapping table using the loaded subset.

According to embodiments of the present disclosure, it is possible to quickly update a mapping table when updating the same.

In addition, according to embodiments of the present disclosure, it is possible to optimize update performance for a mapping table within a limit that guarantees caching performance for the mapping table to a predetermined level or higher.

BRIEF DESCRIPTION OF THE DRAWINGS

The above and other aspects, features, and advantages of the present disclosure will become more apparent from the following detailed description taken in conjunction with the accompanying drawings, in which.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
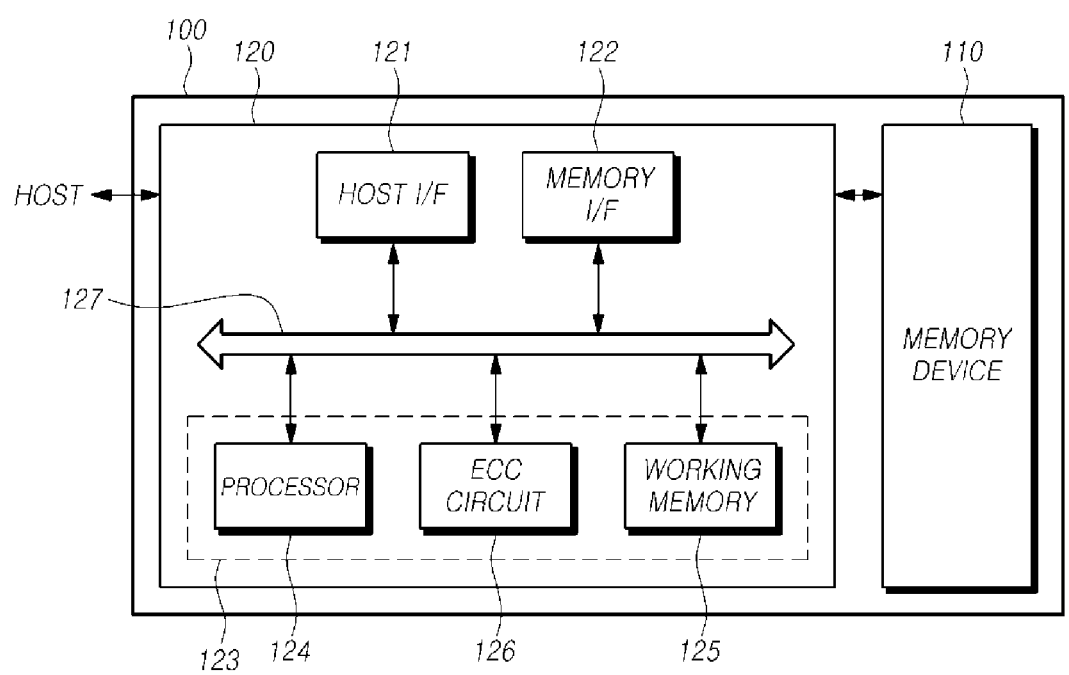
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation") and an erase operation.

The memory device 110 may include a memory cell array including multiple memory cells (also simply referred to as "cells") configured to store data. The memory cell array may exist inside a memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation and an erase operation. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device 110.

The memory controller 120 and the host may be separate devices. In another embodiment, the memory controller 120 and the host may be integrated and implemented as a single device. In the following description, the memory controller 120 and the host are separate devices.

In FIG. 1, the memory controller 120 may include a host interface (I/F) 121, a memory interface 122 and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control operation of the memory device 110 by exercising overall control of the memory controller 120. For example, the control circuit 123 may include a processor 124 and a working memory 125. The control circuit 123 may further include an error detection and correction (detection/correction) circuit (i.e., ECC circuit) 126 and the like.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 using a derandomizing seed. The derandomized data may be output to the host.

The processor 124 may execute firmware (FW) so as to control the operation of the memory controller 120. In other words, the processor 124 may control overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). As mentioned above, the FTL is configured to translate between a logical address received from the host and a physical address of the memory device 110. The HIL is configured to interpret a command that the host issues to the memory system 100 (or storage device) and to deliver the same to the FTL. The FIL is configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect one or more error bits of target data using an error correction code, and to correct the detected error bit(s). For example, the target data may be data stored in the working memory 125, data retrieved from the memory device 110, or the like.

The error detection/correction circuit 126 may be implemented to decode data using the error correction code. The error detection/correction circuit 126 may be implemented using various code decoders. For example, the error detection/correction circuit 126 may be implemented with a decoder that performs nonsystematic code decoding or a decoder that performs systematic code decoding.

For example, the error detection/correction circuit 126 may detect error bit(s), sector by sector, with regard to each piece of read data. That is, each piece of read data may include multiple sectors. As used herein, a sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of these elements may be omitted, and/or one or more of these elements may be integrated into a single element. Of course, as those skilled in the art will understand, the memory controller 120 may also contain one or more other elements in addition to the elements identified above.

Hereinafter, the memory device 110 is described in more detail with reference to FIG. 2.

Figure 2:
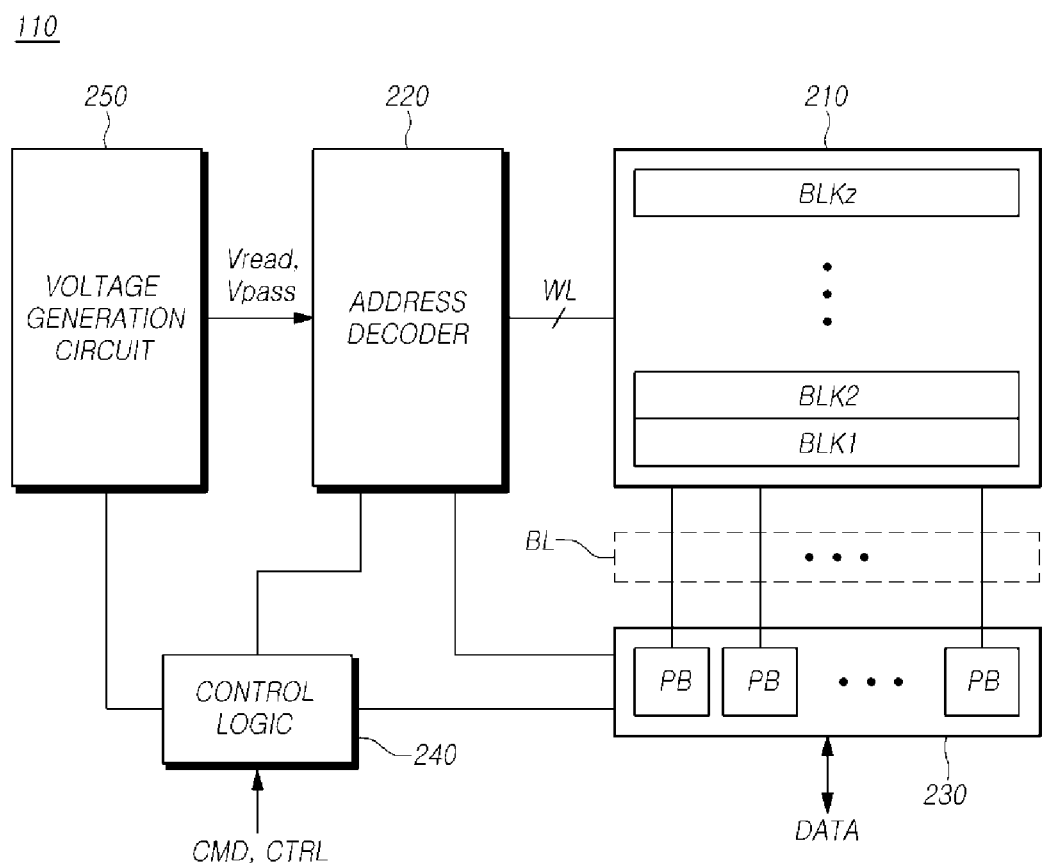
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read/write circuit 230, control logic 240, and a voltage generation circuit 250.

The memory cell array 210 may include multiple memory blocks BLK1-BLKz (where z is a natural number greater than or equal to 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells may be a single-level cell (SLC) configured to is store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

In FIG. 2, the address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer (not shown) inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
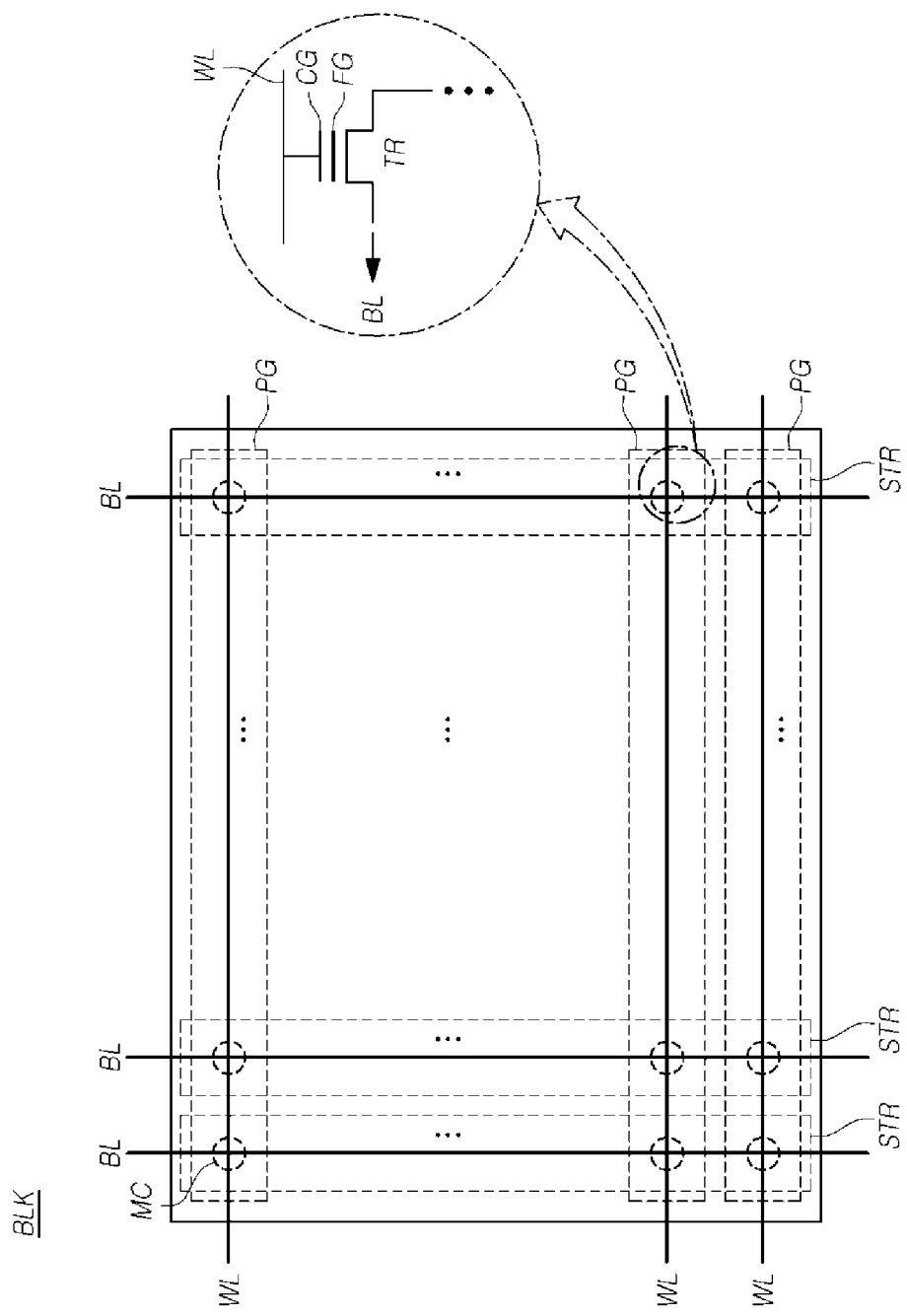
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, the memory block BLK may be arranged and configured in such direction that multiple pages PG and multiple strings STR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, dummy word line(s) may be additionally arranged between the second outermost word line and the second selection line.

In the case of a memory block structure as illustrated in FIG. 3, a read operation and a program operation (i.e., write operation) may be performed page by page, and an erase operation may be performed memory block by memory block.

Figure 4:
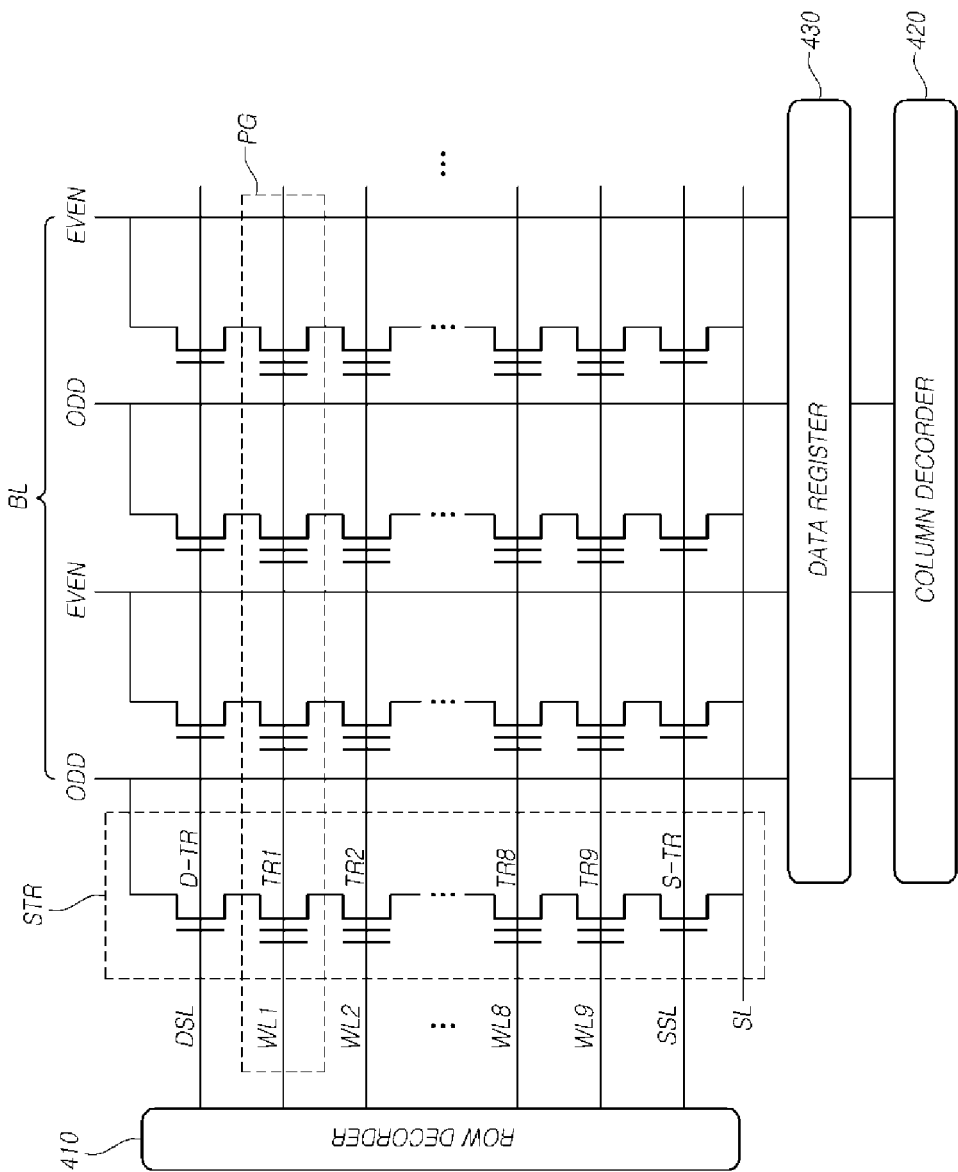
FIG. 4 is a diagram illustrating the structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL, which may include alternating odd- and even-numbered bit lines, may be connected to the column decoder 420.

For accessing a memory cell MC, the address may be input to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC among memory cells MC connected in series may slightly differ from the voltage applied to another memory cell further down the line, due to the voltage drop across the preceding memory cell MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

In the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned at opposite ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
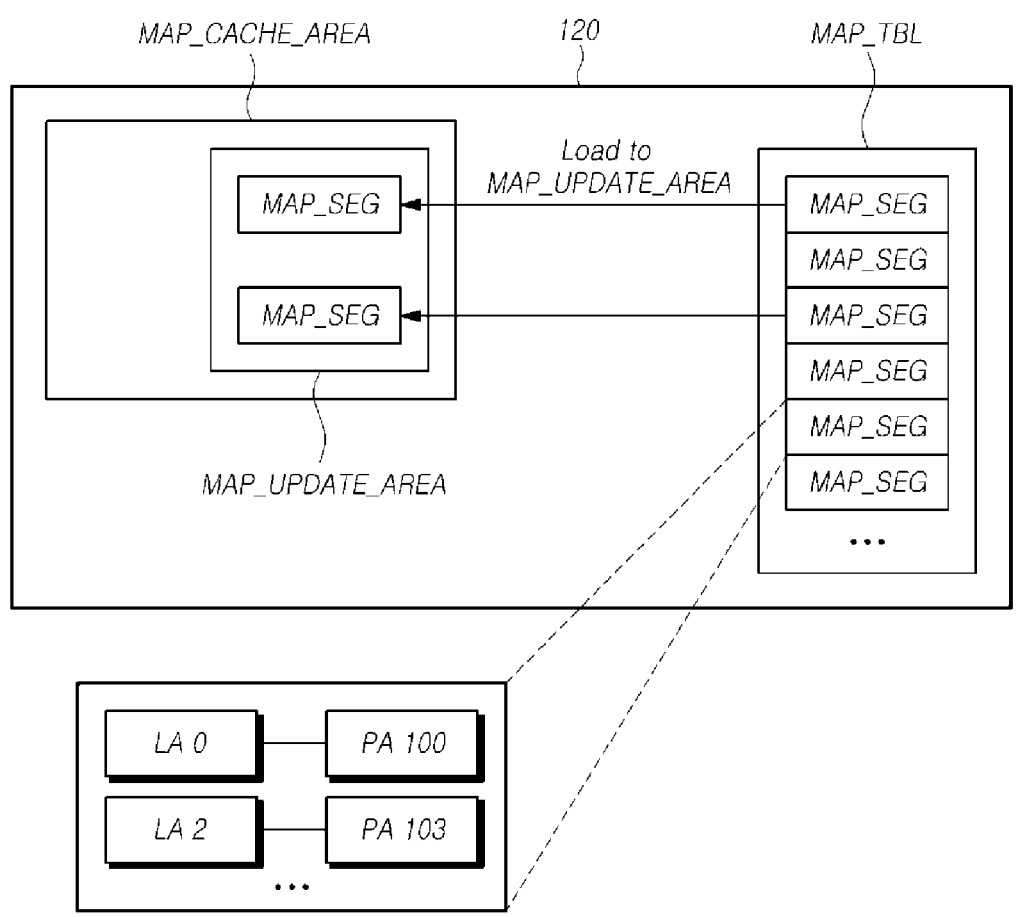
FIG. 5 is a diagram schematically illustrating operation of a memory system according to an embodiment of the present disclosure.

FIG. 5 is a diagram schematically illustrating operation of the memory system 100 of FIG. 1 according to an embodiment of the present disclosure.

Referring to FIG. 5, the memory controller 120 of the memory system 100 may include a mapping table MAP_TBL which includes mapping information between logical addresses and physical addresses. The memory controller 120 may assign a portion of a map cache area MAP_CACHE_AREA for caching map segments MAP_SEG of the mapping table MAP_TBL as a map update area MAP_UPDATE_AREA in order to update the mapping table MAP_TBL.

The mapping table MAP_TBL may reside on the working memory 125 of the memory controller 120. The mapping table MAP_TBL may be loaded from the memory device 110 when the memory system 100 is booted.

In an embodiment, the map cache area MAP_CACHE_AREA may reside on the working memory 125 of the memory controller 120, like the mapping table MAP_TBL. Alternatively, in another embodiment, the map cache area MAP_CACHE_AREA may reside on volatile memory (e.g., TCM, SRAM, DRAM, or SDRAM) that is different from the working memory 125.

The mapping table MAP_TBL may include a plurality of map segments MAP_SEG, each of which may include a plurality of pieces of mapping information. Each piece of mapping information may indicate a specific physical address PA mapped to a specific logical address LA. In the illustrated example, the mapping information may indicate that a logical address LA 0 and a physical address PA 100 are mapped to each other. As another example, the mapping information may indicate that a logical address LA 2 and a physical address PA 103 are mapped to each other.

The mapping information in the map segment MAP_SEG, which is cached in the map cache area MAP_CACHE_AREA, may be changed by a program/erase operation, a background operation (e.g., garbage collection), or the like. The memory controller 120 may update the mapping table MAP_TBL in order to reflect changes in the map segments MAP_SEG cached in the map cache area MAP_CACHE_AREA.

In this case, before updating the mapping table MAP_TBL, the memory controller 120 may pre-assign a portion of the map cache area MAP_CACHE_AREA as a map update area MAP_UPDATE_AREA. The map update area MAP_UPDATE_AREA is the area used for updating the mapping table MAP_TBL.

Pre-assigning a portion of the map cache area before updating the mapping table may increase the speed at which the updating is performed. This is due to the fact that if a map segment MAP_SEG to be updated is loaded before the memory controller 120 updates the mapping table MAP_TBL, the time taken to retrieve that map segment may be reduced.

In addition, the memory controller 120 may load the subset of map segments MAP_SEG described above to the map update area MAP_UPDATE_AREA in order to update the mapping table MAP_TBL. The subset may include some or all of map segments MAP_SEG in the mapping table MAP_TBL.

For example, if it is determined that updating the mapping table MAP_TBL is imminent, the memory controller 120 may load all or some of the segments MAP_SEG in the mapping table MAP_TBL to the map update area MAP_UPDATE_AREA before updating the mapping table.

In this case, the time at which the memory controller 120 assigns a portion of the map cache area MAP_CACHE_AREA as the map update area MAP_UPDATE_AREA may be, for example, the time at which the number of writable pages in an open memory block for processing write commands received from the host is less than or equal to a threshold number of pages. Hereinafter, this is described in detail with reference to FIGS. 6 and 7.

Figure 6:
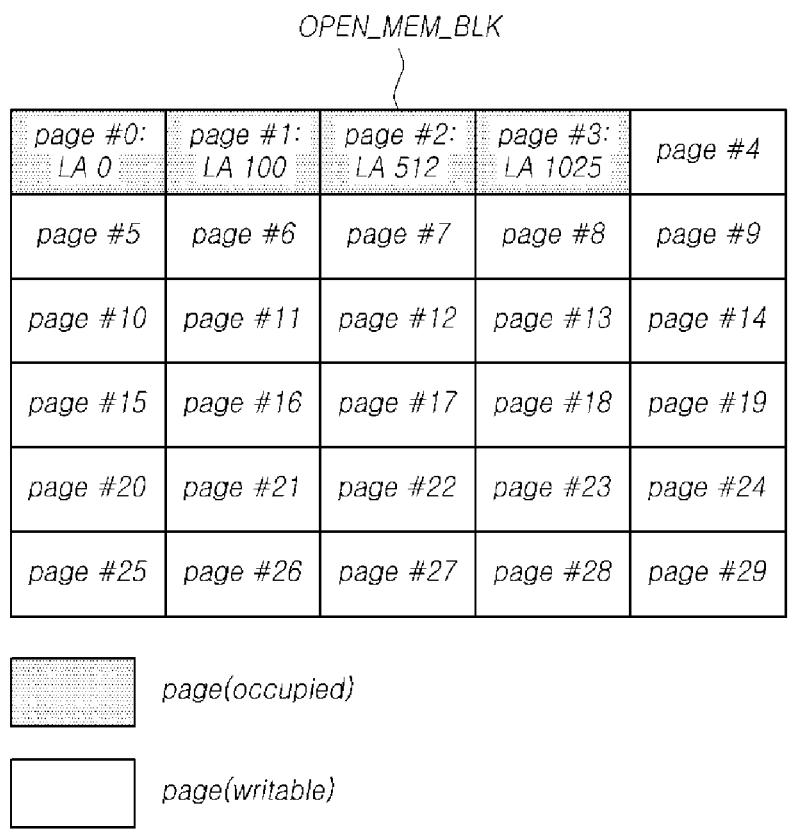
FIG. 6 is a diagram illustrating configuration of an open memory block according to an embodiment of the present disclosure.

FIG. 6 is a diagram illustrating the configuration of an open memory block OPEN_MEM_BLK according to an embodiment of the present disclosure.

Referring to FIG. 6, the memory controller 120 may control the memory device 110 so as to store write data received from the host in an open memory block OPEN_MEM_BLK, in units of pages, in response to write commands received from the host. The open memory block OPEN_MEM_BLK may include a plurality of pages, each of which may be an occupied page in which data is stored, or may be a writable page in which no data is stored.

The data stored in respective pages in the open memory block OPEN_MEM_BLK may correspond to specific logical address values. For example, in the open memory block OPEN_MEM_BLK shown in FIG. 6, the data stored in page #0 corresponds to a logical address LA 0, the data stored in page #1 corresponds to a logical address LA 100, the data stored in page #2 corresponds to a logical address LA 512, and the data stored in page #3 corresponds to a logical address LA 1025. In addition, pages #4 to #29 are writable pages in which no data is stored.

Figure 7:
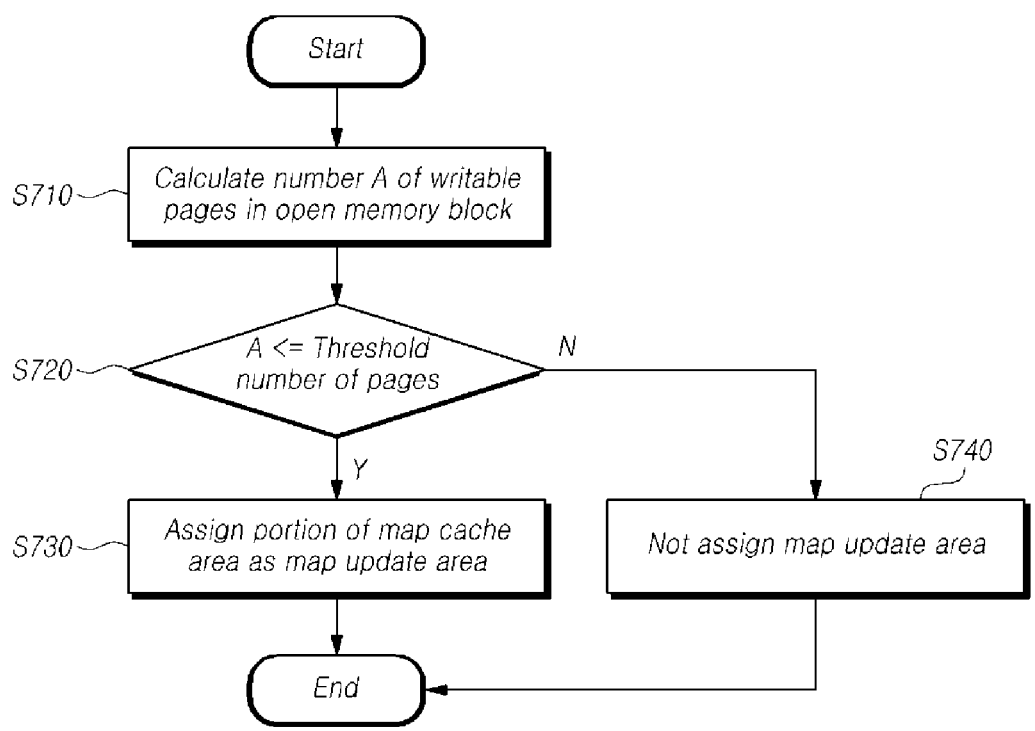
FIG. 7 is a flowchart illustrating an example of an operation in which a memory system assigns a map update area according to an embodiment of the present disclosure.

FIG. 7 is a flowchart illustrating an example of an operation in which the memory system 100 of FIG. 1 assigns a map update area MAP_UPDATE_AREA according to an embodiment of the present disclosure.

Referring to FIG. 7, the memory controller 120 of the memory system 100 may calculate the number of writable pages in the open memory block OPEN_MEM_BLK denoted as A (S710). In the example of FIG. 6, the number of writable pages in the open memory block OPEN_MEM_BLK and thus A is 26, i.e., the writable pages include pages 4 to 29.

The memory controller 120 determines whether or not A is less than or equal to a threshold number of pages (e.g., 10 or 20) (S720).

If A is less than or equal to the threshold number of pages ("Y" in S720), this means that the time for updating the mapping table MAP_TBL is imminent. Thus, the memory controller 120 may assign a portion of the map cache area MAP_CACHE_AREA as a map update area MAP_UPDATE_AREA (S730).

On the other hand, if A exceeds the threshold number of pages ("N" in S720), this means that the time for updating the mapping table MAP_TBL is not imminent. Therefore, the memory controller 120 does not assign the map update area MAP_UPDATE_AREA in the map cache area MAP_CACHE_AREA to continue to use the map cache area MAP_CACHE_AREA only for caching (S740).

Hereinafter, an operation of selecting sub-areas to be assigned as a map update area MAP_UPDATE_AREA from among the areas in the map cache area MAP_CACHE_AREA when a portion of the map cache area MAP_CACHE_AREA is assigned as the map update area MAP_UPDATE_AREA is described.

Figure 8:
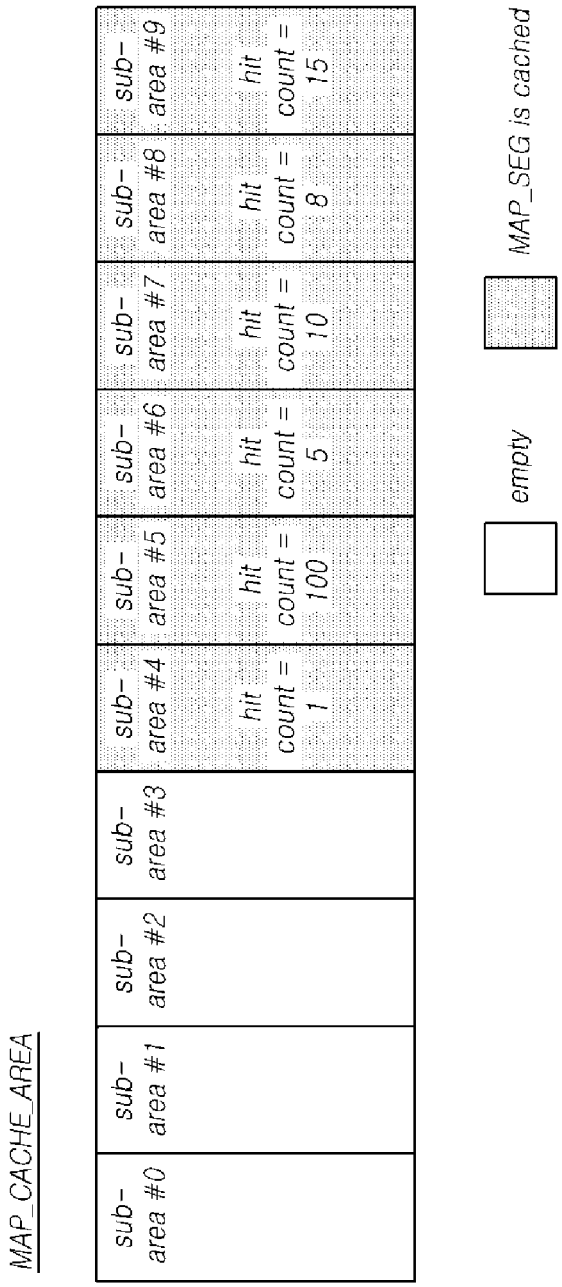
FIG. 8 is a diagram illustrating an example of a map cache area according to an embodiment of the present disclosure.

FIG. 8 is a diagram illustrating an example of a map cache area MAP_CACHE_AREA according to an embodiment of the present disclosure.

In some embodiments, the map cache area MAP_CACHE_AREA may be divided into a plurality of sub-areas. Specifically, the map cache area MAP_CACHE_AREA may be divided into 1) empty sub-areas in which the map segments MAP_SEG are not cached and 2) sub-areas in which the map segments MAP_SEG are cached.

In the illustrated example of FIG. 8, the map cache area MAP_CACHE_AREA may be divided into ten sub-areas, whereby sub-areas #0, #1, #2, and #3 are empty sub-areas, and sub-areas #4, #5, #6, #7, #8, and #9 are sub-areas in which the map segments MAP_SEG are cached.

In some embodiments, the memory controller 120 may calculate a hit count for each of the map segments MAP_SEG cached in the map cache area MAP_CACHE_AREA during a first period of time (e.g., 500 ms). Each time any one of the map segments MAP_SEG cached in the map cache area MAP_CACHE_AREA is referenced (hit) by a read command or a write command received from the host during the first period of time, the hit count for the referenced map segment MAP_SEG may be increased by one.

In the illustrated example of FIG. 8, the hit counts for six map segments MAP_SEG cached in the map cache area MAP_CACHE_AREA are 1, 100, 5, 10, 8, and 15, respectively. Specifically, the hit count of the map segment cached in sub-area #4 is 1, the hit count of the map segment cached in sub-area #5 is 100, the hit count of the map segment cached in sub-area #6 is 5, the hit count of the map segment cached in sub-area #7 is 10, the hit count of the map segment cached in sub-area #8 is 8, and the hit count of the map segment cached in sub-area #9 is 15.

Figure 9:
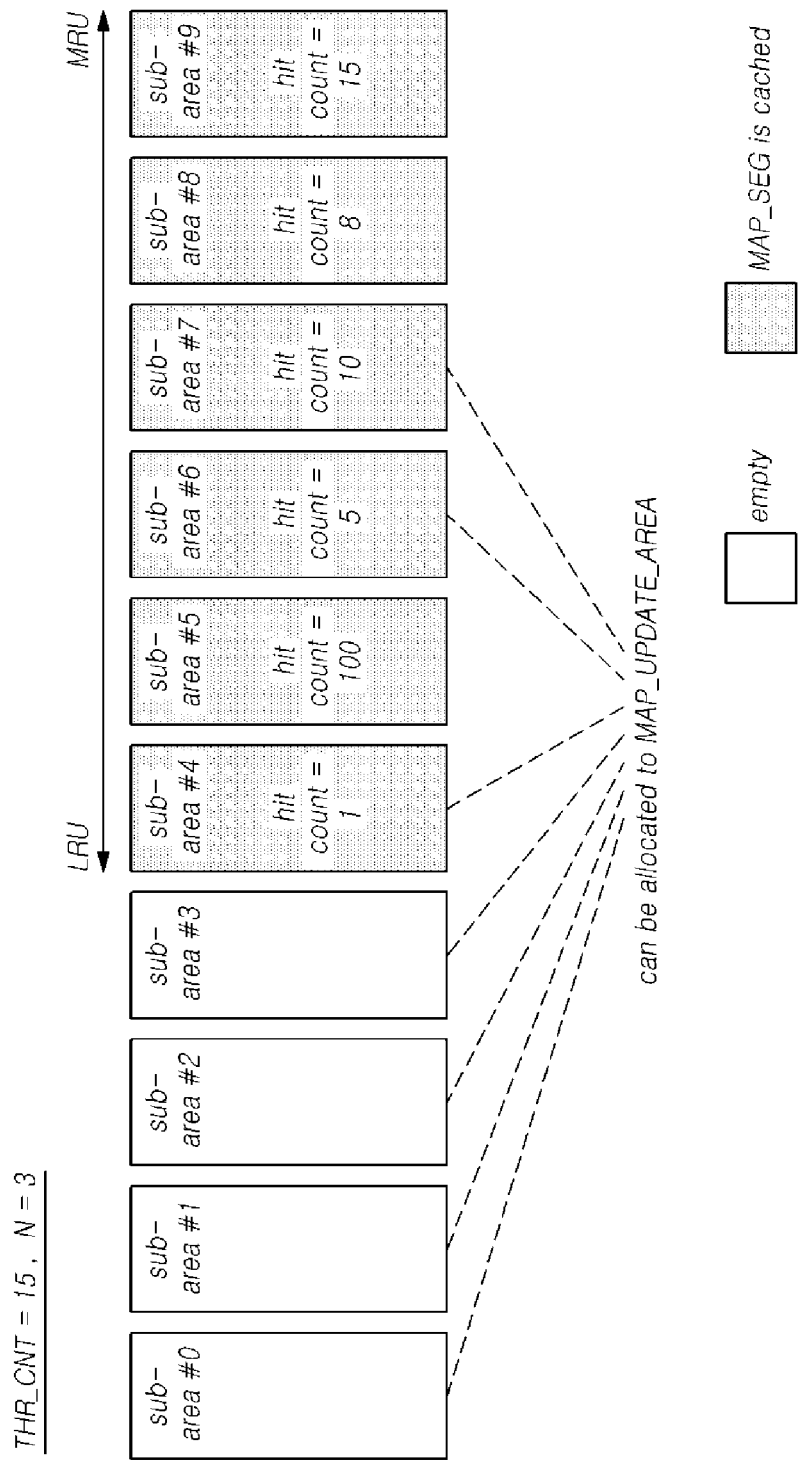
FIG. 9 is a diagram illustrating an example of a sub-area in the map cache area in FIG. 8 that can be assigned to a map update area.

FIG. 9 is a diagram illustrating an example of a sub-area in the map cache area MAP_CACHE_AREA that can be assigned as a map update area MAP_UPDATE_AREA.

In some embodiments, the memory controller 120 may assign, as a map update area MAP_UPDATE_AREA, all or some of 1) the sub-areas in which the map segments MAP_SEGMENT are not cached or 2) the sub-areas in which N least recently used (LRU) map segments MAP_SEG, the hit counts of which per a first period of time are less than a threshold hit count THR_CNT, are cached, where N is a natural number. Here, the "least recently used map segment" refers to a map segment most recently used (i.e., hit), which is the oldest among all used map segments.

That is, the sub-area in the map update area MAP_UPDATE_AREA may be 1) the sub-area in which the map segment MAP_SEGMENT is not cached or 2) the sub-area in which any one of the N least recently used map segments MAP_SEG, the hit counts of which per a first period of time are less than the threshold hit count THR_CNT is cached.

In the illustrated example of FIG. 9, it is assumed that six sub-areas, in which the map segments MAP_SEG are cached, have recently been hit in the order of 1) sub-area #4 in which the map segment having a hit count of 1 is cached, 2) sub-area #5 in which the map segment having a hit count of 100 is cached, 3) sub-area #6 in which the map segment having a hit count of 5 is cached, 4) sub-area #7 in which the map segment having a hit count of 10 is cached, and 5) sub-area #8 in which the map segment having a hit count of 8 is cached. In addition, it is assumed that a threshold hit count THR_CNT is 15 and N is 3.

Four sub-areas in which the map segments MAP_SEG are not cached may be included in the map update area MAP_UPDATE_AREA.

In addition, the sub-area satisfying the aforementioned conditions, among the six sub-areas in which the map segments MAP_SEG are cached, may be included in the map update area MAP_UPDATE_AREA.

The sub-area in which the map segment having a hit count of 1 is cached may be included in the map update area MAP_UPDATE_AREA.

The sub-area in which the map segment having a hit count of 100 is cached cannot be included in the map update area MAP_UPDATE_AREA because the hit count of 100 is greater than the threshold hit count of 15. A map segment having a hit count greater than or equal to the threshold hit count is preferably maintained to be cached later because the map segment is more likely to be referenced in the future.

The sub-area in which the map segment having a hit count of 5 is cached may be included in the map update area MAP_UPDATE_AREA.

The sub-area in which the map segment having a hit count of 10 is cached may be included in the map update area MAP_UPDATE_AREA.

The sub-area in which the map segment having a hit count of 8 is cached cannot be included in the map update area MAP_UPDATE_AREA. This is due to the fact that although the hit count of 8 is less than the threshold hit count of 15, there are sub-areas in which three map segments are cached, which have respective hit counts less than the threshold hit count and which their respective recent hits are older.

The sub-area in which the map segment having a hit count of 15 is cached cannot be included in the map update area MAP_UPDATE_AREA because the hit count of 15 is not less than the threshold hit count of 15.

Therefore, the map update area MAP_UPDATE_AREA may be assigned on the basis of a total of seven sub-areas including the empty sub-areas, i.e., sub-areas #0, #1, #2, and #3, and sub-areas #4, #6, and #7, among the six sub-areas in which the map segments MAP_SEG are cached. For example, the assigned map update area MAP_UPDATE_AREA may include all seven sub-areas described above, or may include only some of the seven sub-areas (e.g., four sub-areas or five sub-areas).

Hereinafter, a process of loading map segments MAP_SEG to a map update area MAP_UPDATE_AREA assigned to update the mapping table MAP_TBL is described.

Figure 10:
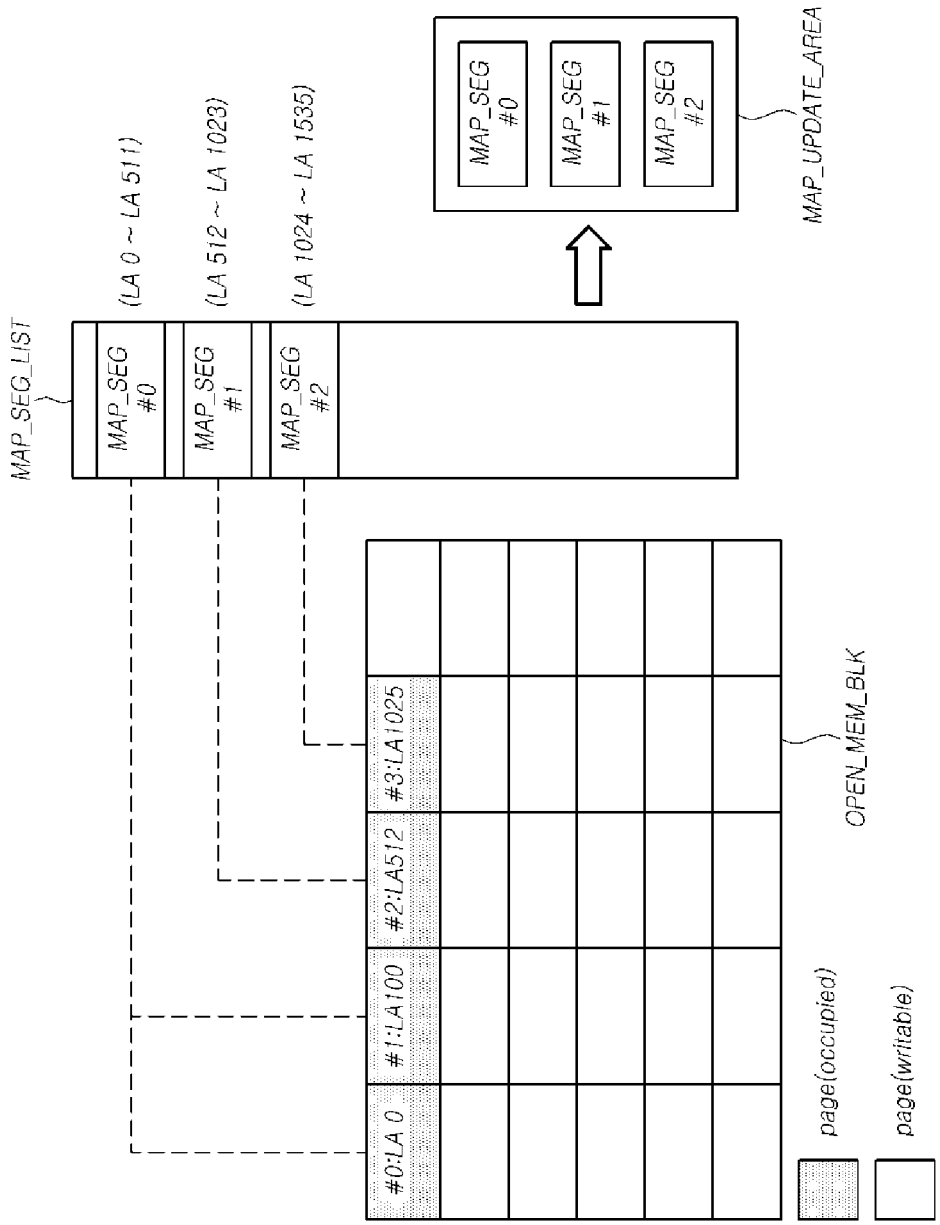
FIG. 10 is a diagram illustrating an example of a map segment loaded to a map update area.

FIG. 10 is a diagram illustrating an example of map segments loaded to a map update area MAP_UPDATE_AREA.

In the illustrated example of FIG. 10, it is assumed that data corresponding to the logical address LA 0, the logical address LA 100, the logical address LA 512, and the logical address LA 1025 has been written to the open memory block OPEN_MEM_BLK of FIG. 6. In addition, it is assumed that each map segment MAP_SEG includes 512 pieces of mapping information between logical addresses and physical addresses.

In this case, target map segments, which are the map segments that include the logical addresses of data written to the open memory block OPEN_MEM_BLK, may be selected as follows.

First, map segment #0 MAP_SEG #0 including mapping information on logical addresses 0 to 511 may be selected as a target map segment. The map segment #0 MAP_SEG #0 includes the logical address 0 and the logical address 100.

In addition, map segment #1 MAP_SEG #1 including mapping information on logical addresses 512 to 1023 may also be selected as a target map segment. The map segment #1 MAP_SEG #1 includes the logical address 512.

In addition, map segment #2 MAP_SEG #2 including mapping information on logical addresses 1024 to 1535 may also be selected as a target map segment. The map segment #2 MAP_SEG #2 includes the logical address 1025.

The memory controller 120 may manage a list of target map segments MAP_SEG_LIST in order to quickly load the four target map segments described above to the map update area MAP_UPDATE_AREA.

The memory controller 120 may manage the list of target map segments MAP_SEG_LIST using any of various data structures. For example, the memory controller 120 may manage the list of target map segments MAP_SEG_LIST in an array. The memory controller 120 sequentially accesses the target map segments in the list of target map segments MAP_SEG_LIST and loads the same to the map update area MAP_UPDATE_AREA. In this case, if the list of target map segments MAP_SEG_LIST is managed in an array, it is possible to quickly access respective target map segments.

When data is written to the open memory block OPEN_MEM_BLK, the memory controller 120 may identify the logical address corresponding to the written data, and may add information on the map segment MAP_SEG including the mapping information corresponding to the above logical address to the list of target map segments MAP_SEG_LIST.

However, if the information on the map segment, which includes the mapping information corresponding to the logical address, has already been added to the list of target map segments MAP_SEG_LIST, the memory controller 120 may omit the addition operation described above.

For example, if the logical address LA 0 corresponds to the data written to the open memory block OPEN_MEM_BLK, the memory controller 120 may add information on the map segment #0 MAP_SEG #0, which includes the mapping information corresponding to the logical address 0, to the list of target map segments MAP_SEG_LIST. Thereafter, if the logical address 100 corresponds to the data written to the open memory block OPEN_MEM_BLK, since the information on the map segment #0 MAP_SEG #0, which includes the mapping information corresponding to the logical address 100, has already been added to the list of target map segments MAP_SEG_LIST, the memory controller 120 may omit the operation of adding the information on the map segment #0 MAP_SEG #0 to the list of target map segments MAP_SEG_LIST.

In addition, if the logical address LA 512 corresponds to the data written to the open memory block OPEN_MEM_BLK, the memory controller 120 may add information on the map segment #1 MAP_SEG #1, which includes the mapping information corresponding to the logical address LA 512, to the list of target map segments MAP_SEG_LIST.

In addition, if the logical address LA 1025 corresponds to the data written to the open memory block OPEN_BLK, the memory controller 120 may add information on the map segment #2 MAP_SEG #2, which includes the mapping information corresponding to the logical address LA 1025, to the list of target map segments MAP_SEG_LIST.

Thereafter, when loading the map segments MAP_SEG to the map update area MAP_UPDATE_AREA in order to update the mapping table MAP_TBL, the memory controller 120 may retrieve the map segment #0 MAP_SEG #0, the map segment #1 MAP_SEG #1, and the map segment #2 MAP_SEG #2 from the list of target map segments MAP_SEG_LIST, and may load the same to the map update area MAP_UPDATE_AREA.

Even after assigning the map update area MAP_UPDATE_AREA, the memory controller 120 may change the size of the map update area MAP_UPDATE_AREA. After analyzing the workload, the memory controller 120 may change the size of the map update area MAP_UPDATE_AREA according to the workload.

For example, the workload may be defined as the ratio of write commands to all commands received from the host during a second period of time (e.g., 2 seconds), and if such ratio is greater than or equal to a threshold ratio, the memory controller 120 may change the size of the map update area MAP_UPDATE_AREA by comparing a hit ratio of the map cache area with a reference hit ratio. Hereinafter, this operation is be described in detail with reference to FIG. 11.

Figure 11:
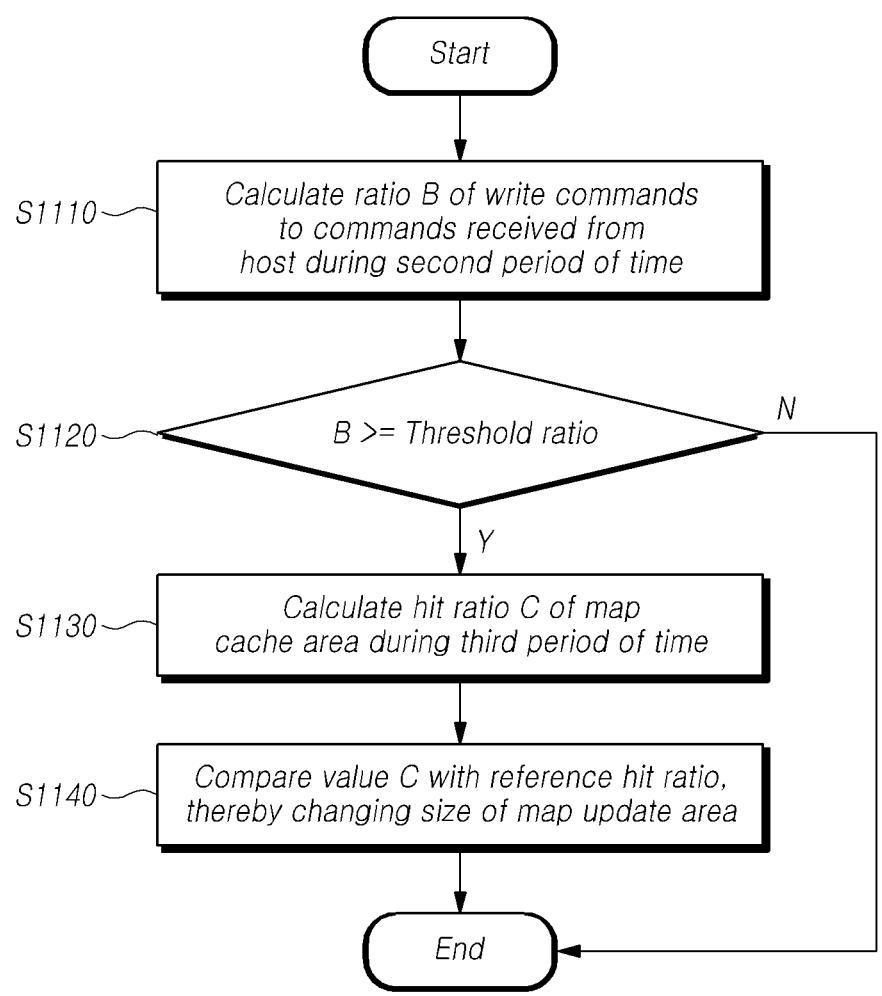
FIG. 11 is a flowchart illustrating an example of an operation in which a memory system changes the size of a map update area according to an embodiment of the present disclosure.

FIG. 11 is a flowchart illustrating an example of an operation in which the memory system 100 of FIG. 1 changes the size of a map update area MAP_UPDATE_AREA according to embodiments of the present disclosure.

Referring to FIG. 11, the memory controller 120 of the memory system 100 may calculate the ratio of write commands to all commands received from the host during a second period of time (S1110), such ratio being denoted as B. Here, the ratio B may be obtained by the ratio of the number of write commands received from the host during the second period of time to all commands received from the host during the second period of time. For example, if 50 write commands and 30 read commands are received from the host HOST during the second period of time, B is 50/(30+50)=62.5%.

The memory controller 120 determines whether or not the ratio B calculated in step S1110 is greater than or equal to a threshold ratio (S1120). If the ratio B is less than the threshold ratio ("N" in S1120), the memory controller 120 does not perform the operation of changing the size of the map update area MAP_UPDATE_AREA. This is due to the fact that the ratio B being less than the threshold ratio means that a small number of write operations are received, and in this case, since the mapping table MAP_TBL has a little change, there is a low probability in that the update of the mapping table MAP_TBL is imminent.

On the other hand, if the ratio B is greater than or equal to the threshold ratio ("Y" in S1120), the memory controller 120 may preferentially calculate the hit ratio C of the map cache area MAP_CACHE_AREA in order to change the size of the map update area MAP_UPDATE_AREA (S1130).

The hit ratio C of the map cache area MAP_CACHE_AREA may be calculated as the ratio of the number of pieces of mapping information that are hit (i.e., successfully retrieved) from the map cache area MAP_CACHE_AREA to the total number of times the mapping information is retrieved from the map cache area MAP_CACHE_AREA during a third period of time (e.g., 1 second). For example, if 100 pieces of mapping information are retrieved during the third period of time, if 40 pieces of mapping information thereof are hit, and if 60 pieces of mapping information thereof are missed, the hit ratio C is calculated as 40/100=40%.

The memory controller 120 may compare the value C calculated in step S1130 with a reference hit ratio, thereby changing the size of the map update area MAP_UPDATE_AREA (S1140). A specific example of the memory controller 120 changing the size of the map update area MAP_UPDATE_AREA is described in detail with reference to FIG. 13 below.

The reference hit ratio described above may be fixed, or may be dynamically changed depending on the size of the map update area MAP_UPDATE_AREA.

Figure 12:
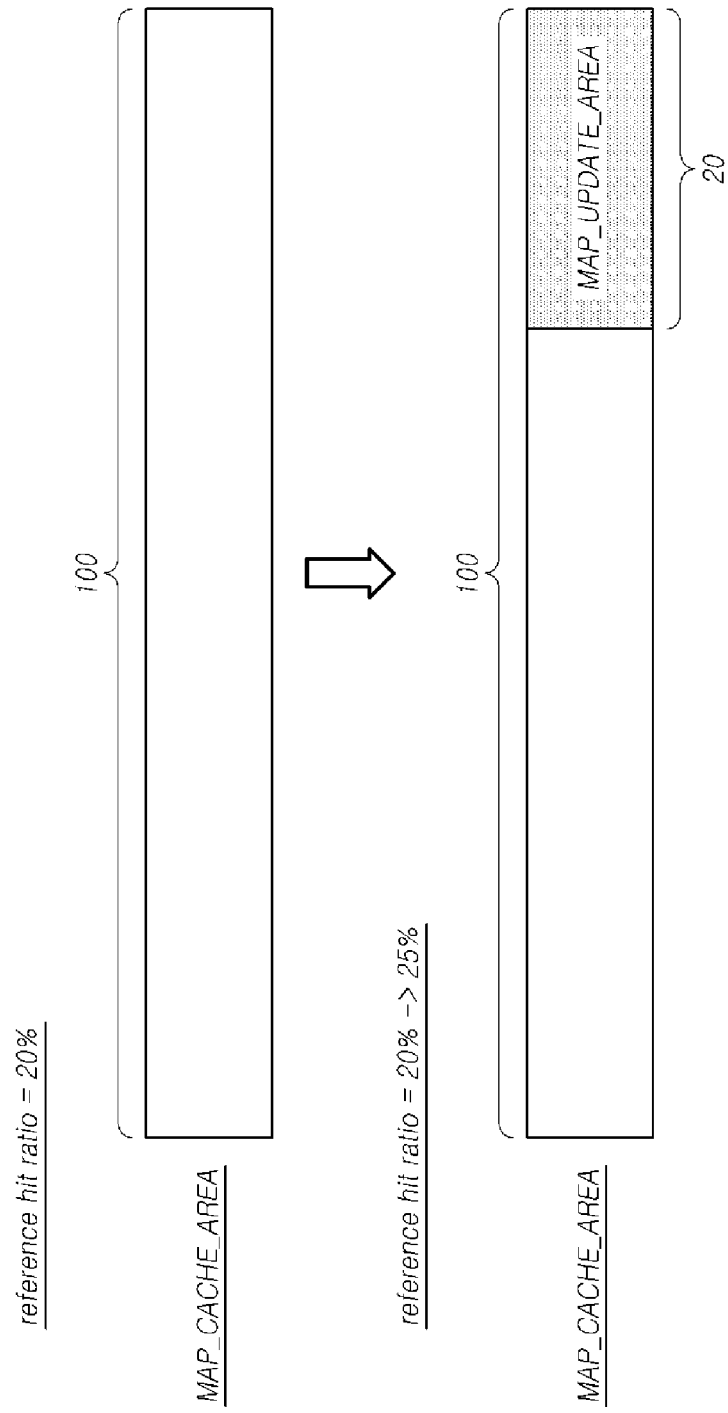
FIG. 12 is a diagram illustrating an example in which a memory system changes a reference hit ratio according to an embodiment of the present disclosure.

FIG. 12 is a diagram illustrating an example in which the memory system 100 of FIG. 1 changes a reference hit ratio according to an embodiment of the present disclosure.

Referring to FIG. 12, it is assumed that the total size of the map cache area MAP_CACHE_AREA is 100, and the reference hit ratio is set to 20% before assigning or allocating a portion of the map cache area as a map update area MAP_UPDATE_AREA.

If the portion of the map cache area MAP_CACHE_AREA having a size of 100 that is assigned as the map update area has a size of 20, the reference hit ratio may be changed from 20% to 25%. This is due to the fact that the caching performance of the map cache area MAP_CACHE_AREA, when the size used for caching in the map cache area MAP_CACHE_AREA is 100 and the hit ratio is 20%, is the same as the caching performance of the map cache area MAP_CACHE_AREA when the size used for caching in the map cache area MAP_CACHE_AREA is 80 (=100−20) and the hit ratio is 25%.

That is, as the size of the map update area MAP_UPDATE_AREA increases, the size used for caching in the map cache area MAP_CACHE_AREA decreases, so in order for the map cache area MAP_CACHE_AREA to ensure the same caching performance, the hit ratio is required to be increased. Accordingly, the reference hit ratio increases when the size of the map update area MAP_UPDATE_AREA increases, and decreases when the size of the map update area MAP_UPDATE_AREA is reduced. That is, the reference hit ratio may be changed proportionally to the size of the map update area MAP_UPDATE_AREA.

Figure 13:
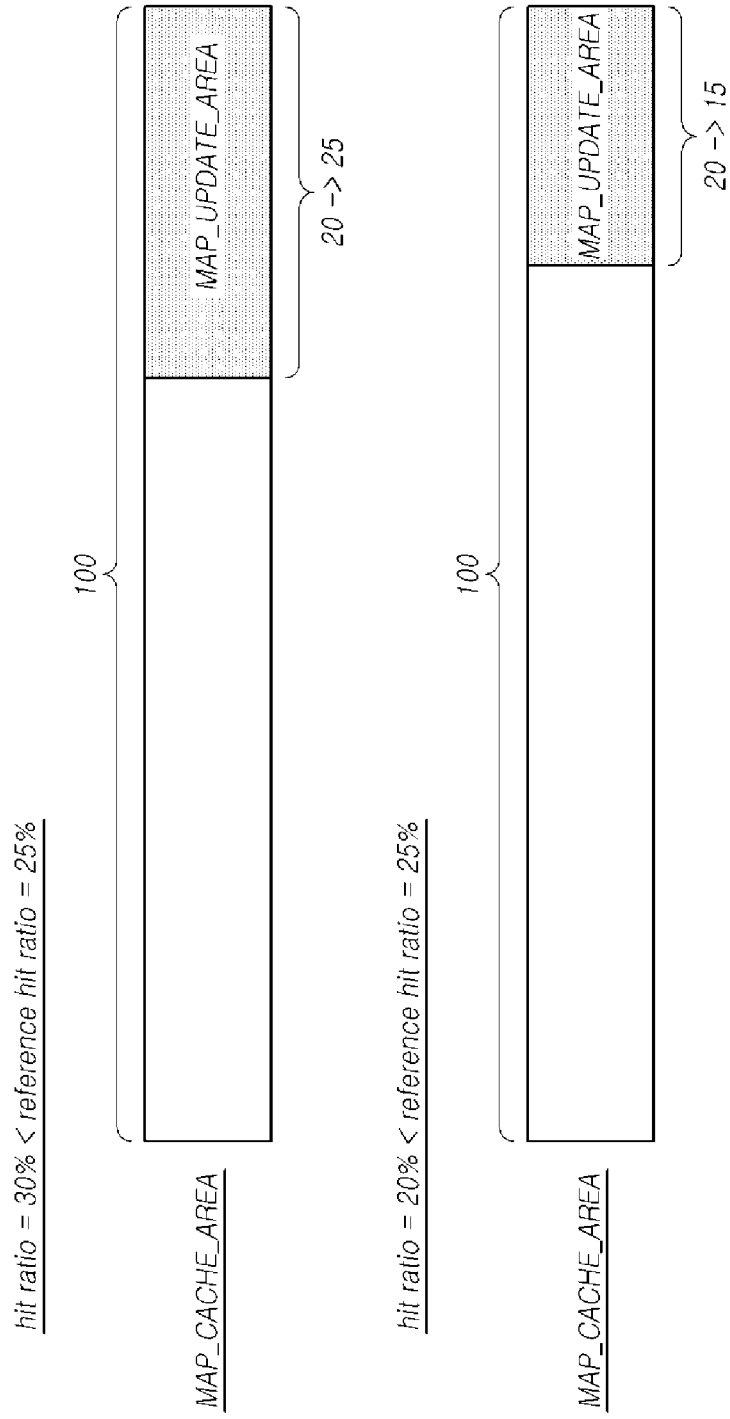
FIG. 13 is a diagram illustrating an example in which a memory system changes the size of a map update area by comparing a hit ratio of a map cache area with a reference hit ratio according to an embodiment of the present disclosure.

FIG. 13 is a diagram illustrating an example in which the memory system 100 of FIG. 1 changes the size of a map update area MAP_UPDATE_AREA by comparing a hit ratio of a map cache area MAP_CACHE_AREA with a reference hit ratio according to an embodiment of the present disclosure.

In FIG. 13, it is assumed that the total size of a map cache area MAP_CACHE_AREA is 100, 20 of which is assigned as a map update area MAP_UPDATE_AREA, and that the reference hit ratio is 25%.

In the illustrated example at the top of FIG. 13, it is assumed that the hit ratio of the map cache area MAP_CACHE_AREA is 30%, which is greater than the reference hit ratio of 25%. In this case, even if more of the map cache area MAP_CACHE_AREA is assigned as a map update area MAP_UPDATE_AREA, the caching performance may be ensured up to the reference hit ratio. Accordingly, the memory controller 120 of the memory system 100 may increase the size of the map update area MAP_UPDATE_AREA from 20 to 25.

In the illustrated example at the bottom of FIG. 13, it is assumed that the hit ratio of the map cache area MAP_CACHE_AREA is 20%, which is less than the reference hit ratio of 25%. In this case, in order to increase the hit ratio of the map cache area MAP_CACHE_AREA close to the reference hit ratio, the area to be used for caching is further required. Accordingly, the memory controller 120 of the memory system 100 may reduce the size of the map update area MAP_UPDATE_AREA from 20 to 15.

As described above, it is possible to optimize the update performance for the mapping table MAP_TBL within the limit that ensures that the caching performance for the mapping table MAP_TBL is maintained at a set level or higher by changing the size of the map update area MAP_UPDATE_AREA so as to satisfy the reference hit ratio of the map cache area MAP_CACHE_AREA.

Figure 14:
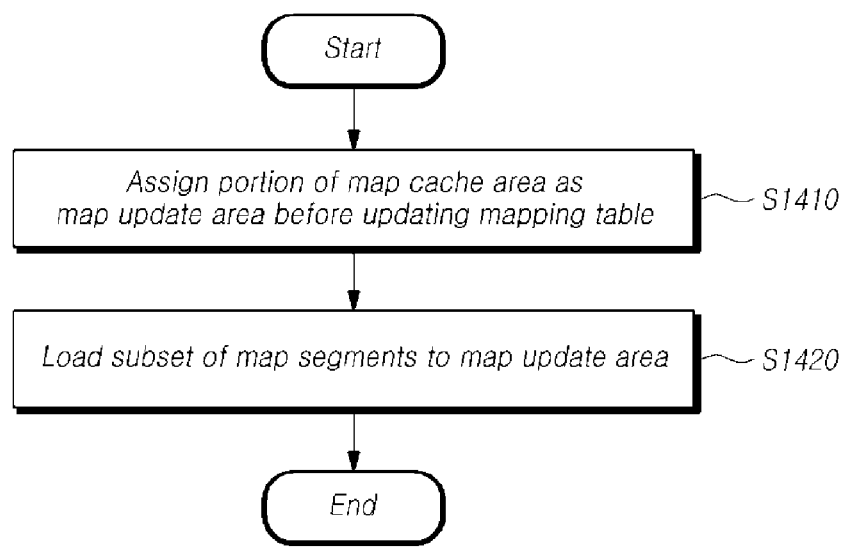
FIG. 14 is a flowchart illustrating an operation method of a memory system according to an embodiment of the present disclosure.

FIG. 14 is a flowchart illustrating an operation method of the memory system 100 of FIG. 1 according to an embodiment of the present disclosure.

Referring to FIG. 14, the operation method of the memory system 100 may include a step of assigning a portion of the map cache area MAP_CACHE_AREA for caching a plurality of map segments MAP_SEG in the mapping table MAP_TBL as a map update area MAP_UPDATE_AREA for updating the mapping table MAP_TBL S1410). This step is performed before updating the mapping table MAP_TBL, which includes mapping information between logical and physical addresses.

In this case, if the number of writable pages in the open memory block OPEN_MEM_BLK for processing write commands received from the host HOST is less than or equal to a threshold number of pages, a portion of the map cache area MAP_CACHE_AREA may be assigned as the map update area MAP_UPDATE_AREA.

In addition, the operation method of the memory system 100 may include a step of loading a subset of map segments MAP_SEG to the map update area MAP_UPDATE_AREA (S1420).

In this case, the sub-area in the map update area MAP_UPDATE_AREA may be, for example, 1) the sub-area in which the map segment MAP_SEG is not cached or 2) the sub-area in which any one of the N least recently used map segments MAP_SEG, the hit counts of which per a first period of time are less than a threshold hit count, is cached, where N is a natural number.

In addition, the size of the map update area MAP_UPDATE_AREA may be changed based on the result of comparing a hit ratio of the map cache area MAP_CACHE_AREA with a reference hit ratio when the ratio of write commands to all commands received from the host during a second period of time, is greater than or equal to a threshold ratio.

The above-described operation of the memory controller 120 may be controlled by the control circuit 123, and the processor 124 may be performed in a manner in which various operations of the memory controller 120 execute (or drive) programmed firmware.

Figure 15:
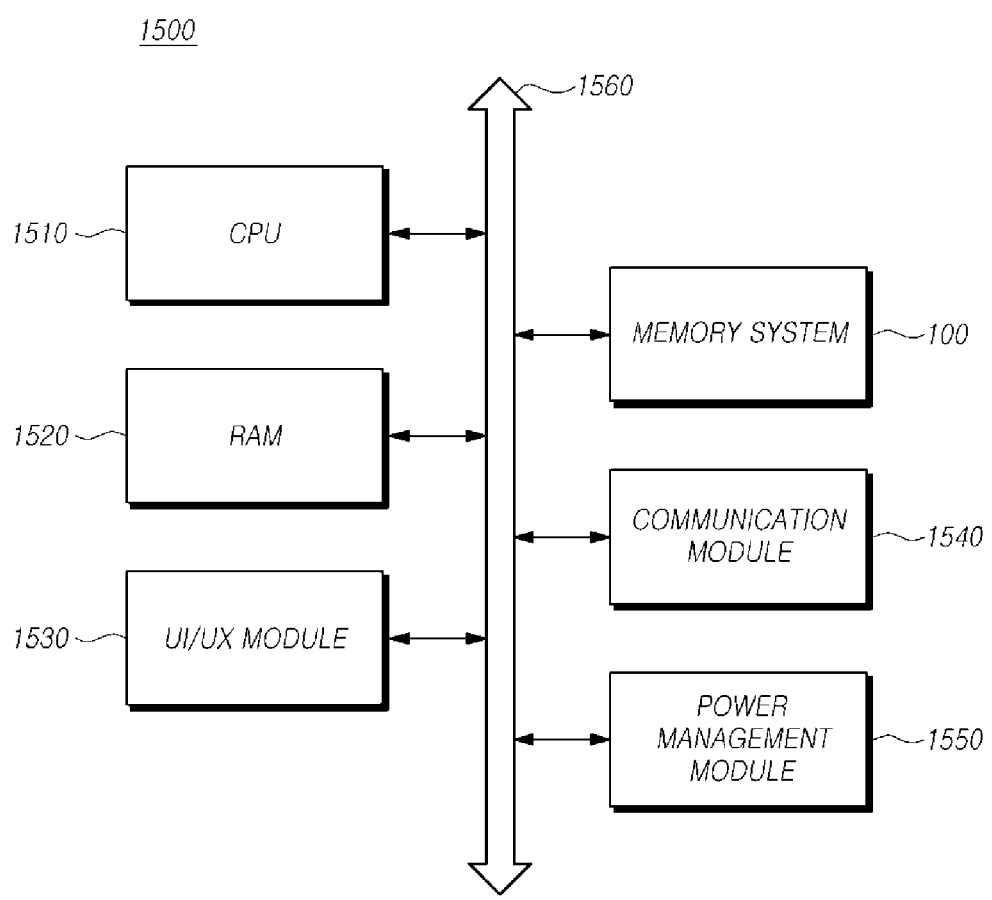
FIG. 15 is a diagram illustrating the configuration of a computing system according to an embodiment of the present disclosure.

FIG. 15 is a diagram illustrating a configuration of a computing system 1500 according to an embodiment of the present disclosure.

Referring to FIG. 15, the computing system 1500 may include: a memory system 100 electrically connected to a system bus 1560; a central processing unit (CPU) 1510 configured to control the overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device in a wired and/or wireless manner; and a power management module 1550 configured to manage power used by the computing system 1500.

The computing system 1500 may be a personal computer (PC) or may include a mobile terminal such as a smartphone, a tablet or any of various other electronic devices.

The computing system 1500 may further include a battery for supplying an operating voltage, an application chipset, a graphic-related module, a camera image processor, and a dynamic random access memory (DRAM). Of course, the computing system 1500 may include other elements as a person skilled in the art will understand.

The memory system 100 may include a device configured to store data in a magnetic disk such as a hard disk drive (HDD), and/or a device configured to store data in a non-volatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various types of storage devices mounted inside any of various electronic devices.

According to embodiments of the present disclosure described above, operation delay time of the memory system may be minimized. In addition, according to an embodiment of the present disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the disclosure as set forth in the accompanying claims. That is, the present disclosure encompasses all modifications and variations of any of the disclosed embodiments that fall within the scope of the claims.

What is claimed is:

1. A memory system comprising:
a memory device; and
a memory controller coupled to the memory device, and configured to:
before updating a mapping table which includes mapping information between logical addresses and physical addresses, assign a portion of a map cache area for caching a plurality of map segments in the mapping table as a map update area, in the map cache area, used to load map segments which are used for updating the mapping table and the map segments to be stored in the map update area are used to update the mapping table to reflect changes in the map segments cached in the map cache area; and
load a subset of the plurality of map segments to the map update area,
wherein the memory controller is configured to change a size of the map update area by comparing a hit ratio of the map cache area with a reference hit ratio when a ratio of write commands to all commands received from a host for a second period of time is greater than or equal to a threshold ratio.

2. The memory system of claim 1, wherein the memory controller is configured to assign the portion of the map cache area as the map update area when the number of writable pages in an open memory block of the memory device for processing write commands received from a host is less than or equal to a threshold number of pages.

3. The memory system of claim 2, wherein a sub-area in the map update area is a sub-area in which at least one of the plurality of map segments is not cached or a sub-area in which any of N least recently used map segments, hit counts of which per a first period of time are less than a threshold hit count, is cached.

4. The memory system of claim 2, wherein the memory controller is configured to load, to the map update area, a target map segment, which is a map segment comprising a logical address of data written to the open memory block, among the plurality of map segments.

5. The memory system of claim 4, wherein the memory controller is configured to manage a list of the target map segments in an array.

6. The memory system of claim 1, wherein the reference hit ratio is changed in proportion to the size of the map update area.

7. The memory system of claim 1, wherein the memory controller is configured to increase the size of the map update area when the hit ratio of the map cache area is greater than or equal to the reference hit ratio during a third period of time.

8. The memory system of claim 1, wherein the memory controller is configured to decrease the size of the map update area when the hit ratio of the map cache area is less than the reference hit ratio during a third period of time.

9. A memory controller comprising:
   a memory interface configured to communicate with a memory device; and
   a control circuit coupled to the memory device, and configured to:
     before updating a mapping table which includes mapping information between logical addresses and physical addresses, assign a portion of a map cache area for caching a plurality of map segments in the mapping table as a map update area, in the map cache area, used to load map segments which are used for updating the mapping table and the map segments to be stored in the map update area are used to update the mapping table to reflect changes in the map segments cached in the map cache area; and
     load a subset of the plurality of map segments to the map update area,
   wherein the control circuit is configured to change a size of the map update area by comparing a hit ratio of the map cache area with a reference hit ratio when a ratio of write commands to all commands received from a host for a second period of time is greater than or equal to a threshold ratio.

10. The memory controller of claim 9, wherein the control circuit is configured to assign the portion of the map cache area as the map update area when the number of writable pages in an open memory block of the memory device for processing write commands received from a host is less than or equal to a threshold number of pages.

11. The memory controller of claim 10, wherein a sub-area in the map update area is a sub-area in which at least one of the plurality of map segments is not cached or a sub-area in which any of N least recently used map segments, hit counts of which per a first period of time are less than a threshold hit count, is cached.

12. The memory controller of claim 10, wherein the control circuit is configured to load, to the map update area, a target map segment, which is a map segment comprising a logical address of data written to the open memory block, among the plurality of map segments.

13. The memory controller of claim 12, wherein the control circuit is configured to manage a list of the target map segments in an array.

14. The memory controller of claim 9, wherein the reference hit ratio is changed in proportion to the size of the map update area.

15. An operation method of a memory system comprising a memory device and a memory controller configured to control the memory device, the method comprising:
   before updating a mapping table which includes mapping information between logical addresses and physical addresses, assigning a portion of a map cache area for caching a plurality of map segments in the mapping table as a map update area, in the map cache area, used to load map segments which are used for updating the mapping table and the map segments to be stored in the map update area are used to update the mapping table to reflect changes in the map segments cached in the map cache area;
   loading a subset of the plurality of map segments to the map update area; and
   changing a size of the map update area, based on a result of comparing a hit ratio of the map cache area with a reference hit ratio when a ratio of write commands to all commands received from a host for a second period of time is greater than or equal to a threshold ratio.

16. The method of claim 15, further comprising assigning the portion of the map cache area as the map update area when the number of writable pages in an open memory block of the memory device for processing write commands received from a host is less than or equal to a threshold number of pages.

17. The method of claim 16, wherein a sub-area in the map update area is a sub-area in which at least one of the plurality of map segments is not cached or a sub-area in which any of N least recently used map segments, hit counts of which per a first period of time are less than a threshold hit count, is cached.

* * * * *